(12) United States Patent
Barrault (10) Patent No.: US 9,823,060 B2
(45) Date of Patent: Nov. 21, 2017

(54) COMMON CALIBRATION SYSTEM AND CORRESPONDING METHOD

(71) Applicant: Michel Raymond Barrault, Mens (FR)

(72) Inventor: Michel Raymond Barrault, Mens (FR)

(73) Assignee: ALPAO, Montbonnot (FR)

( * ) Notice: Subject to any disclaimer, the term of this patent is extended or adjusted under 35 U.S.C. 154(b) by 718 days.

(21) Appl. No.: 14/369,498

(22) PCT Filed: Dec. 21, 2012

(86) PCT No.: PCT/FR2012/053042
§ 371 (c)(1),
(2) Date: Jun. 27, 2014

(87) PCT Pub. No.: WO2013/098514
PCT Pub. Date: Jul. 4, 2013

(65) Prior Publication Data
US 2014/0336969 A1    Nov. 13, 2014

(30) Foreign Application Priority Data

Dec. 29, 2011    (FR) ...................................... 11 62542

(51) Int. Cl.
*G01B 11/14*    (2006.01)
*G01L 27/00*    (2006.01)
(Continued)

(52) U.S. Cl.
CPC .............. *G01B 11/14* (2013.01); *G01B 11/24* (2013.01); *G01L 27/002* (2013.01); *G02B 26/0816* (2013.01); *G02B 26/0825* (2013.01)

(58) Field of Classification Search
USPC ........................................................ 702/94
See application file for complete search history.

(56) References Cited

U.S. PATENT DOCUMENTS 5,032,026 A * 7/1991 Jouve ..................... G01D 5/266
356/478
5,561,247 A    10/1996 Mutoh et al.
(Continued)

FOREIGN PATENT DOCUMENTS

CH    WO 2011015302 A1 *  2/2011    ........... G01L 9/0005
WO   WO 2011/015302 A1    2/2011

OTHER PUBLICATIONS

International Search Report, dated Mar. 8, 2013 in connection with PCT International Application No. PCT/FR2012/053042, filed Dec. 21, 2012.

*Primary Examiner* — Paul D Lee
(74) *Attorney, Agent, or Firm* — John P. White; Cooper & Dunham LLP (57) ABSTRACT

The invention relates to a system (1) comprising a deformable surface (2) and a first and a second sensor (C1, C2) designed to provide a first and a second measurement signal (S1, S2) intended to be collected by a processing circuit (12), said system (1) comprising first and second measurement paths (V1, V2) for collecting the first and second measurement signals (S1, S2), said system (1) being characterized in that it comprises a common calibration member (20) for simultaneously injecting into the first and second measurement paths (V1, V2) a calibration signal ($S_E$), said common calibration member (20) being designed so that the image signals (S'1, S'2, S'n) restored via said measurement paths (V1, V2, Vn) are independent of said movable surface (2). Deformable movable surface systems, of the deformable mirror type.

19 Claims, 3 Drawing Sheets

(51) Int. Cl.
*G02B 26/08* (2006.01)
*G01B 11/24* (2006.01)

(56) References Cited

U.S. PATENT DOCUMENTS

| | | | |
|---|---|---|---|
| 2002/0101646 A1* | 8/2002 | Ide | G01B 7/287 359/295 |
| 2003/0061884 A1* | 4/2003 | Miodushevsky | G01L 1/2243 73/795 |
| 2006/0187517 A1 | 8/2006 | Ljungblad | |
| 2007/0019159 A1 | 1/2007 | Nakanishi et al. | |

* cited by examiner

COMMON CALIBRATION SYSTEM AND CORRESPONDING METHOD

CROSS-REFERENCE TO RELATED APPLICATIONS

This application is a §371 national stage of PCT International Application No. PCT/FR2012/053042, filed Dec. 21, 2012, claiming priority of French Patent Application No. 1162542, filed Dec. 29, 2011, the contents of each of which are hereby incorporated by reference in their entirety.

TECHNICAL FIELD

The present invention pertains to the general field of systems with mobile and/or deformable surface, such as for example pressure sensors, loudspeakers, or in a preferential manner, deformable mirrors used in adaptive optical systems, for applications as diverse as astronomy, medicine, in particular ophthalmology, telecommunications, metrology, etc.

The present invention pertains more particularly to a system comprising a mobile and/or deformable surface as well as at least one first and one second sensor designed to provide respectively a first and a second measurement signal relating to the shape and/or to the position of said mobile and/or deformable surface and intended to be gathered by a processing circuit designed to determine the shape and/or the position of said mobile and/or deformable surface, said system comprising for this purpose at least one first measurement pathway making it possible to gather the first measurement signal and one second measurement pathway making it possible to gather the second measurement signal.

The present invention also pertains to a method of calibrating the processing circuit of a system with mobile and/or deformable surface.

PRIOR ART

It is known to employ deformable mirrors to correct the irregularities of the wavefront of a light beam.

For this purpose, such deformable mirrors are provided with a deformable reflecting surface, generally formed by a flexible membrane to the back of which are linked actuators capable of maneuvering the membrane locally.

It is thus possible to compensate for the phase shifts responsible for the deformation of the wavefront by modifying the optical path traversed by the various rays constituting the beam which is reflected on said membrane.

In view of the precision required for the positional servocontrol of the membrane, and therefore of the actuators, it is indispensable to calibrate such mirrors, thereby making it necessary to calibrate the actuators and the shape of the mirror, and therefore also to carry out a measurement of a dynamic character.

For this purpose, it is possible to undertake a calibration of the mirror through optical measurements, by illuminating the reflecting surface of the mirror and by analyzing the reflected beam, for example by means of an interferometer or of a wavefront sensor such as a Shack-Hartmann sensor.

However, such a procedure involves the implementation of a particularly cumbersome and expensive external apparatus, which must itself be calibrated so as not to falsify the measurements intended for the calibration of the mirror. Such a procedure is also a source of external errors, insofar as the size of the mirror must be adapted to suit the size of the wavefront sensor. One is thus compelled to add devices for adapting the size of the optical beam, the shape of which devices is not perfectly known.

Moreover, whatever known calibration procedure is employed, the latter makes it necessary to interrupt the service of the mirror, or indeed to dismantle the latter to test it on an appropriate measurement bench. A calibration is also necessary when the external conditions change (temperature, possibly pressure).

Of course, such a maintenance operation with a view to the calibration of the mirror gives rise to a non-negligible operating cost while depriving the user of said mirror for the corresponding duration.

DISCLOSURE OF THE INVENTION

The subject matters assigned to the invention are consequently aimed at remedying the various above-mentioned drawbacks and at proposing a novel system with mobile and/or deformable surface, in particular a deformable mirror, whose calibration is simplified and fast, and does not make it necessary to interrupt the service of said system over the long term.

Another subject matter assigned to the invention is aimed at proposing a novel system with mobile or deformable surface, in particular a deformable mirror, which exhibits a structure, and in particular calibration means, which are particularly simple, robust, and compact.

Another subject matter assigned to the invention is aimed at proposing a novel system with mobile or deformable surface, in particular a deformable mirror, the calibration and operation of which are particularly precise, reliable and reproducible.

Another subject matter assigned to the invention is aimed at proposing a novel system with mobile and/or deformable surface, in particular a deformable mirror, whose calibration can be carried out automatically and frequently without significantly disturbing the operation of said system.

Another subject matter assigned to the invention is aimed at proposing a novel method of calibrating the servocontrol circuit for a system with mobile and/or deformable surface, such as a deformable mirror, which makes it possible to carry out simple, fast and inexpensive calibration of said system.

Another subject matter assigned to the invention is aimed at proposing a novel calibration method which does not disturb, indeed which does not interrupt, the service of a system with mobile and/or deformable surface, such as a deformable mirror.

Another subject matter assigned to the invention is aimed at proposing a novel calibration method which is versatile and which can be adapted to suit various calibration and operating configurations of a system with mobile and/or deformable surface, such as a deformable mirror.

Finally, the subject matters assigned to the invention are aimed at proposing a novel method of calibrating a system with mobile and/or deformable surface, such as a deformable mirror, which is particularly precise, reliable, and reproducible.

The subject matters assigned to the invention are achieved with the aid of a system comprising a mobile and/or deformable surface as well as at least one first and one second sensor designed to provide respectively a first and a second measurement signal relating to the shape and/or to the position of said mobile and/or deformable surface and intended to be gathered by a processing circuit designed to determine the shape and/or the position of said mobile and/or deformable surface on the basis of said measurement signals, said system comprising for this purpose at least one first measurement pathway making it possible to gather the first measurement signal and one second measurement pathway making it possible to gather the second measurement signal, said system being characterized in that it comprises a common calibration member making it possible to inject a known calibration signal simultaneously into the first measurement pathway and the second measurement pathway so as to allow the calibration of all or part of the processing circuit, said common calibration member being designed such that the image signals retrieved by said measurement pathways in response to the injection of said calibration signal are substantially independent of the shape and of the position of said mobile surface.

The subject matters assigned to the invention are also achieved with the aid of a method of calibrating a servocontrol circuit for a system comprising a mobile and/or deformable surface as well as at least one first and one second sensor designed to provide respectively a first and a second measurement signal relating to the shape and/or to the position of said mobile and/or deformable surface and intended to be gathered, by means respectively of a first and of a second measurement pathway, by a processing circuit designed to determine the shape and/or the position of said mobile and/or deformable surface on the basis of said measurement signals, said method being characterized in that it comprises a step of common calibration which comprises a sub-step of injection in the course of which a predefined calibration signal is injected simultaneously into each of the measurement pathways, and then a sub-step of comparison, in the course of which the image signals retrieved by said measurement pathways are compared with the calibration signal which corresponds to them, the image signals being substantially independent of the shape and of the position of said mobile surface, and then a sub-step of correction in the course of which the system is calibrated so as to obtain at the level of each pathway an image signal which is faithful to the calibration signal which is applied to it.

DESCRIPTIVE OVERVIEW OF THE DRAWINGS

Other subject matters, characteristics and advantages of the invention will appear in greater detail on reading the description which follows, as well as with the aid of the appended figures, provided purely by way of nonlimiting illustration, among which.

BEST WAY OF ACHIEVING THE INVENTION

The present invention pertains to a system 1 comprising a mobile and/or deformable surface 2. By "mobile" is meant here the fact that said surface 2 is liable to move at least locally, and optionally globally (solid displacement). By "deformable" is meant here the fact that said surface 2 is liable to undergo a dimensional change or a change of shape under the effect of the application of a force. Of course, the surface 2 can move globally and deform simultaneously, in which case its displacement decomposes locally into a component of solid displacement and a component of displacement by deformation. Ultimately, the surface 2 is therefore a shifting surface.

For example, the system 1 may form a loudspeaker, in which case the surface 2 consists of the external face of a loudspeaker electro-acoustic membrane. According to another example, the system 1 can constitute a pressure sensor, in which case the surface 2 consists of the external face of a pressure sensitive membrane.

In a preferential manner, the system 1 constitutes a deformable mirror, said mobile and/or deformable surface 2 forming in this case a reflector member. In what follows, for reasons of conciseness and convenience of description, reference will be made exclusively to a system 1 constituting a deformable mirror with a surface 2 forming a reflector member. The references 1 and 2 will therefore designate respectively in what follows the deformable mirror and the reflector member. The deformable mirror 1 is intended to modify, and in particular to straighten, a wavefront in an arbitrary adaptive optics application, for example in the field of astronomy, medicine, and in particular ophthalmology, telecommunications, metrology, spectral analysis, the generation and coupling of laser beams, etc.

Figure 1:
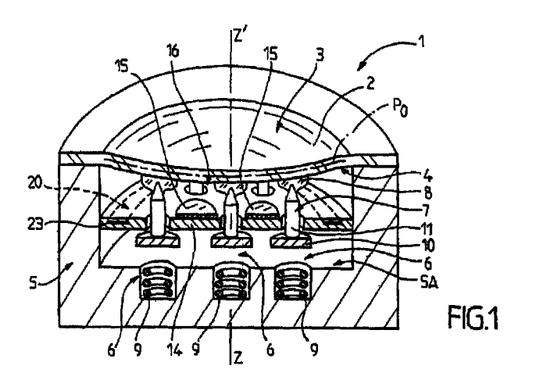
FIG. 1 represents, according to a perspective cut-away view, a variant embodiment of a deformable mirror in accordance with the invention.
Figure 2:
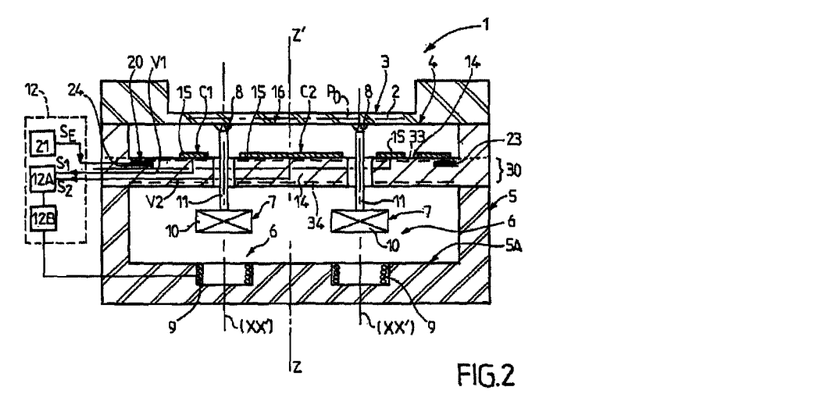
FIG. 2 illustrates, according to a sectional schematic view, a variant embodiment of a deformable mirror in accordance with the invention.

For this purpose, as is in particular illustrated in FIGS. 1 and 2, the deformable mirror 1 comprises a deformable reflector member 2 which possesses a reflecting surface 3, corresponding to the upper face in said figures, which is intended to reflect the incident electromagnetic beam, as well as an opposite face, termed the "hidden face" 4, preferably substantially parallel to said reflecting surface 3. Of course, the reflector member 2 will be able to be adapted so as to reflect an arbitrary electromagnetic beam, and in particular a light beam of the visible and/or invisible spectrum. Moreover, it will be possible for said reflector member 2 to be formed either by a set of juxtaposed rigid plates, independent of one another and mobile or articulated with respect to one another, so as to form facets whose union constitutes a fragmented reflecting face, or, on the contrary, according to a preferential variant embodiment, by a flexible membrane, the reflecting surface 3 thus being advantageously continuous.

Through simple convenience of description, it will be possible for the reflector member 2 to be regarded as a deformable membrane in what follows, so that the reference 2 will be able to designate hereinafter said membrane forming a reflector member. The reflector member 2 is mounted on a main support 5, preferably rigid, which can in particular form a hollow casing covered by the membrane 2 in its upper part, said casing being able optionally to be leaktight. The constituent material of the membrane 2, as well as the thickness of the latter are in no way limited, and will be chosen so as to confer the appropriate mechanical properties on said membrane 2, in particular in regard to flexibility or to resonant frequency, while remaining of course in harmony with the force that can be developed by the actuators 6 (cf. hereinafter) which are intended to cause its deformation. By way of example, said membrane 2 may be made from a polymer film, or else as a slender silicon blanket, whose thickness, preferably substantially constant, may be substantially between 10 µm and 50 µm. Furthermore, the mean profile $P_0$ of the reflector member 2, and more particularly of the reflecting surface 3, may be chosen freely and in particular be either substantially rectilinear, so that the reflecting surface 3 is substantially plane, such as is represented in FIG. 2, or slightly, and preferably regularly, inwardly curved, so that the reflecting surface 3 exhibits on the contrary a domed profile, preferably concave, and that the latter forms for example a dish of spherical cap type, such as is illustrated in FIG. 1, or else of parabolic type. Preferably, the reflecting surface 3 and the hidden face 4 will be substantially parallel and regular, and will follow substantially the same mean profile.

For convenience of description, it will be considered, such as is illustrated in the figures, that the central optical axis (ZZ') of the mirror 1 extends substantially vertically, in a so-called "axial" direction substantially normal to the reflecting surface 3, itself situated at the upper level, and normal to the bottom 5A of the casing 5, itself situated at the lower level, said central optical axis (ZZ') preferably being substantially parallel to the lateral walls of said casing 5. Moreover, the contour laterally delimiting the reflector member 2, and more particularly the deformable reflecting surface 3, according to a so-called "radial" direction substantially transverse to the optical axis (ZZ'), or indeed perpendicular to the axial direction, may be of arbitrary shape. However, said contour will preferably correspond to a polygon, such as a rectangle, preferably to a regular polygon, such as a square, or else to a circle.

Advantageously, the optical axis (ZZ') may correspond to the axis of revolution, or to the axis of invariance under rotation, of the mirror, said mirror being able to in particular take the form of a cylinder, or indeed of a disk, whose generator axis corresponds to said optical axis (ZZ'), such as is illustrated in particular in FIG. 1.

The mirror 1 also comprises at least one actuator 6, and preferably a plurality of actuators 6 arranged as a network, said actuators 6 being able to drive the reflector member 2 locally in displacement, substantially in a direction of deformation (XX'), so as to be able to deform the reflecting surface 3. The direction of deformation (XX') is preferably substantially normal to the reflecting surface, and substantially parallel to the optical axis (ZZ') of the mirror, so that the local deformations of the reflecting surface 3 substantially follow a vertical deformation trajectory, preferably substantially rectilinear. Preferably, each actuator 6 will possess at least one mobile rig 7 fixed to the reflector member 2, and more particularly to the back of the membrane 2, on the hidden face 4, so as to be able to drive said reflector member 2, and more particularly the reflecting surface 3, locally in displacement.

The nature of the link between a mobile rig 7 and the membrane 2 can form the subject of variants, but will preferably be achieved by a glue seal 8, achieved for example with the aid of an elastomer glue. Said glue seal 8 will preferably be formed by separate glue spots making it possible to fix the upper end of each actuator 6 directly and individually to the hidden face 4, by means of a substantially pointlike glue drop. Such a solution makes it possible advantageously to limit the quantity of glue employed, to reduce the possible degassing phenomena when the mirror is required to work under vacuum, and finally avoids having to add, to the back of the membrane, an overlayer which would have the effect of degrading its mechanical properties (extra weight, lowering of the resonant frequency) and thermal properties (dissipation, inhomogeneous expansion causing a warping of bimetallic strip type). It makes it possible furthermore to prevent the surface occupied by the glue from protruding onto the members of the mirror servocontrol chain, and in particular from modifying, for example because of the sensitivity of said glue to ambient humidity, possible capacitive measurements carried out within the servocontrol chain, as will be detailed further on. Of course, the invention is in no way limited to a particular type of actuator, and can in particular call upon any technology liable to create a deformation motion or an expansion, for example mechanical, electrical, electromagnetic, electrostatic, piezoelectric, pneumatic, hydraulic, thermal, etc.

Moreover, each actuator 6 will preferably comprise a base member 9, with respect to which the displacement of the mobile rig 7 associated therewith can take place, and which preferably forms an activation member capable of causing and of controlling the displacement and positional holding of said mobile rig 7, itself advantageously distinct and independent of said base member 9. Furthermore, said base member 9, which for convenience of description may be regarded as an activation member 9 in what follows, is advantageously secured to the main support 5, and preferably to the bottom of the casing 5A to which it may be fixed, or indeed in which it may advantageously be housed or encased.

Figure 5:
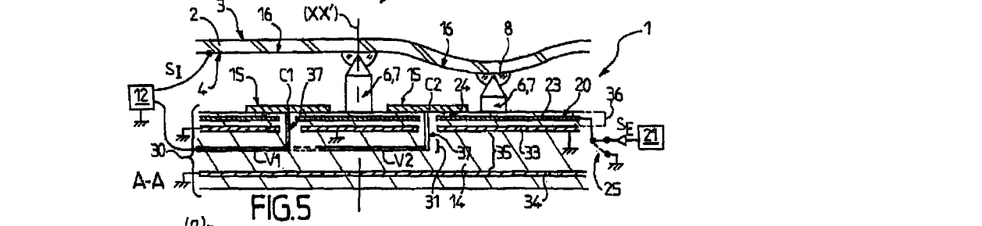
FIG. 5 illustrates, according to a partial sectional schematic view, a variant layout of sensors and of calibration member, corresponding to that of FIG. 4.

According to a preferential variant embodiment corresponding to that represented in FIGS. 1, 2 and 5, the actuators 6 will be of electromagnetic type, the base member 9 being able to be formed by an induction coil which makes it possible to control the intensity and the polarity of the magnetic field that said base member 9 applies to the mobile rig 7, the latter for its part preferably comprising a drive element 10 which can be formed by one or more permanent magnets, and may be regarded, for convenience of description, as a permanent magnet in what follows.

Advantageously, the drive element 10 will be able to be suspended from the reflector member 2 by way of a brace 11 of the rigid rod kind, the latter advantageously exhibiting a narrower cross section than that of said element 10.

Advantageously, the mirror 1 comprises at least one first sensor C1 and one second sensor C2 which are designed to provide respectively a first measurement signal S1 and a second measurement signal S2, said measurement signals S1, S2 being intended to be gathered by a processing circuit 12 designed to determine the shape and/or the position of said mobile and/or deformable surface 2 on the basis of said measurement signals S1, S2. Said first and second measurement signals S1, S2 relate to the shape and/or to the position of the mobile and/or deformable surface 2, and more precisely to the instantaneous form adopted by the mobile and/or deformable surface 2. Preferably, said first and second measurement signals S1, S2 are representative of all or part of the shape adopted at least locally by the surface 2, and preferably by the reflecting surface 3. By "signal relating to the shape and/or to the position" is meant here a signal which can be representative either of the spatial position itself or of the temporal variation of this spatial position (speed or acceleration). In order to gather said signal, the mirror 1 comprises at least one first measurement pathway V1 making it possible to gather the first measurement signal S1, as well as a second measurement pathway V2 making it possible to gather the second measurement signal S2. Preferably, in the preferential embodiment illustrated in the figures, the processing circuit 12 is a servocontrol circuit which controls the deformation and/or the displacement of said mobile and/or deformable surface 2 advantageously forming. In this preferential embodiment, the processing circuit 12 therefore forms a servocontrol circuit controlling the deformation and/or the displacement of the reflector member 2. To this end, the processing circuit 12 is therefore not only designed to determine the shape and/or the position of said mobile and/or deformable surface 2 on the basis of said measurement signals S1, S2, but also to generate control setpoints for the actuators 6 as a function of the shape and/or the position of said mobile and/or deformable surface 2 that it has determined on the basis of said measurement signals S1, S2. In what follows, for the sake of conciseness and simplicity of description, reference will be made exclusively to a processing circuit forming a servocontrol circuit, it being understood that the invention is in no way limited to this particular example.

The servocontrol circuit 12, which advantageously forms an integral part of the system 1, can in particular comprise, in a conventional manner, a measurement and analysis circuit 12A intended to collect and to process the information arising from the sensors C1, C2 on the one hand, and, preferably, a control circuit 12B intended to generate setpoints for controlling each of the actuators 6 on the other hand. Said servocontrol circuit 12 will of course be able to be embodied on the basis of any circuit, computer, programmable automaton or appropriate electronic card.

Preferably, the sensors C1, C2 constitute position sensors making it possible to locally record the variable position of the reflector member 2, and more particularly of the portion of said reflector member which is situated at the level of said sensor, with respect to a reference support 14 integrated into the mirror, and more particularly into the casing 5. Said reference support 14 will be able in particular to extend, opposite the reflector member 2, and more particularly opposite the hidden face 4, according to a surface substantially normal to the optical axis (ZZ') and/or substantially parallel to the surface defined by the mean profile $P_0$ that said reflector member 2 adopts globally when it is at rest or when it is situated in a predefined position considered to be a neutral reference position. Of course, said sensors C1, C2 will perfectly well be able to be employed to measure also, or alternatively, a relative position of the membrane 2 with respect to said reference support 14, or else an amplitude or a speed of displacement of said membrane 2 and/or of the associated mobile rigs 7.

Furthermore, the sensors will be able to be formed equally well by inductive, resistive, piezo-electric sensors, or indeed by probes or even optical sensors using for example a laser beam. However, the sensors C1, C2 will preferably be capacitive sensors and will comprise for this purpose at least one first armature 15, here fixed, disposed on the reference support 14 opposite the reflector member 2, and a second armature 16, here mobile, which is fixed or integral with said reflector member 2, and situated substantially plumb with the first armature 15. The second armature or armatures 16 will optionally be able to be fixed to or formed on the hidden face 4 of the membrane 2, for example by metallic depositions, or indeed, according to a variant embodiment, be formed as a single piece with the membrane 2 when the latter is electrically conducting. It is in this respect noteworthy that the use, for the fixing of the mobile members 7 to the membrane 2, of pointlike glue seals 8 not covering or not overlapping the armatures 15, 16, but on the contrary clearing the surfaces occupied by the latter, avoids the interposition between said armatures 15, 16 of a layer of material, in this instance glue, which, because in particular of its sensitivity to humidity, would run the risk of modifying the characteristics of the dielectric layer, and more particularly its permittivity, and thus of falsifying the capacitive measurements.

Moreover, it is also noteworthy that the actuators 6 may be arranged according to a (first) geometric network of actuators 6, preferably regular, which can comprise a number of actuators greater than or equal to 10, greater than or equal to 50, or indeed greater than or equal to 100. Preferably, said actuators 6 are distributed at the nodes of a network, which extends plumb with the reflector member 2, transversely to the optical axis (ZZ'), and preferably substantially in a plane normal to said optical axis (ZZ') and/or more particularly substantially along the plane of extension of the reference support 14, and whose mesh cells may be for example of square, rhombic, rectangular, or else hexagonal honeycomb shape.

Moreover, the mirror 1 also preferably comprises a plurality of sensors C1, C2, . . . Ci, . . . Cn, with n an integer (n being able for example to be equal to 25 in FIG. 7), disposed substantially plumb with the reflector member 2 according to a (second) geometric network.

Just like the network of actuators 6, the network of sensors C1, C2, Cn stretches preferably plumb with the reflector member 2, transversely to the optical axis (ZZ'), and preferably substantially in a plane normal to said optical axis (ZZ') and/or more particularly substantially according to the reference support 14. Of course, the number, the shape, the surface area and the distribution of the various sensors C1, C2, Cn are in no way limited, and may be identical or on the contrary vary from one sensor to the other.

According to a particularly homogeneous preferential variant embodiment, the armatures, and in particular the first armatures 15 of the various sensors C1, C2, Cn will all exhibit a substantially identical shape and surface area, and will be distributed according to a substantially constant spacing, optionally substantially equal in the two spatial directions transverse to the optical axis.

According to case, the network of sensors C1, . . . Cn will be able to exhibit a layout diagram, and more particularly a geometry and/or a spacing, which are equal, or else on the contrary different from those of the network of actuators 6 with which it is superimposed.

According to a variant embodiment, not represented, the network of actuators 6 and the sensor network C1, Cn will be able to be identical and to coincide, in such a way that to each actuator 6 there corresponds a sensor which is substantially superimposed or immediately, neighboring, and preferably substantially concentric therewith.

Thus, the first armature 15 of all or some of the sensors will be able for example to take the form of an annular pellet drilled at its center so as to define an orifice of passage through which the rod 11 of the corresponding mobile rig 7 can reciprocate back and forth.

Figure 7:
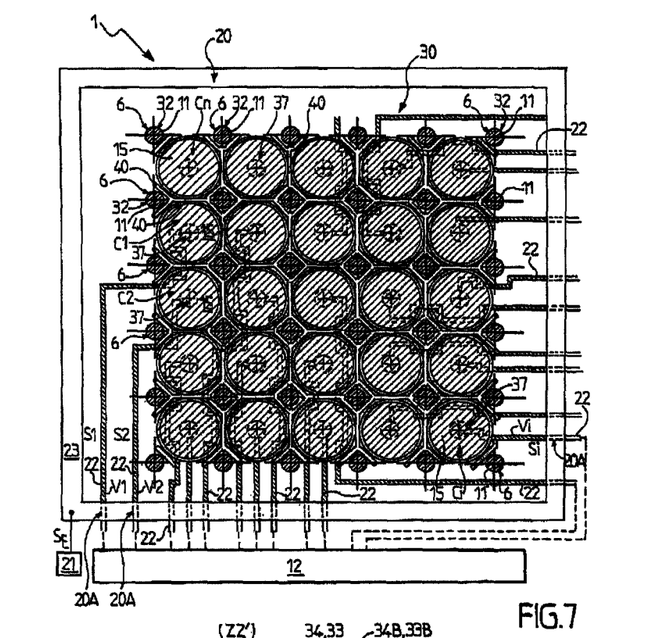
FIG. 7 illustrates, according to a sectional partial schematic view from above, a variant arrangement of sensors and calibration member within a deformable mirror in accordance with the invention.

According to another variant embodiment corresponding in particular to FIG. 7, the sensors C1, C2, Cn are disposed quincuncially with respect to the actuators 6, and may more particularly each be substantially centered on a distinct mesh cell of the network of actuators 6.

Advantageously, such a disposition makes it possible to maximize the size of the first armatures 15 by occupying the space left vacant between the neighboring rods 11, thereby allowing the mirror to gain both in terms of precision of servocontrol, by improving the signal/noise ratio, and in terms of compactness.

According to the invention, the mirror 1 comprises a common calibration member 20 which makes it possible to inject simultaneously into the first measurement pathway V1 and into the second measurement pathway V2, a known calibration signal $S_E$ (in this instance independent of the displacement and deformation of the mobile and/or deformable surface 2) so as to allow the calibration of all or some of the servocontrol circuit 12. Advantageously, by using a calibration member 20 common to the various measurement pathways V1, V2, Vn associated with the sensors C1, C2, Cn, it is possible to apply, with the aid of a simple, inexpensive and compact means, a known and mastered gauge signal $S_E$, and to record the transcription, by each measurement pathway, of said calibration signal in the form of an image signal S'1, S'2, S'n which advises as to the operating state and the characteristics of the measurement pathway concerned. Said common calibration member 20 is in this instance designed such that the image signals S'1, S'2, S'n retrieved by said measurement pathways V1, V2, Vn in response to the injection of said calibration signal $S_E$ are substantially independent of the shape and of the position of said mobile surface 2. By "substantially independent" is meant here the fact that the common calibration member 20 is specifically designed so that the influence of the shape and position of the mobile and/or deformable surface 2 on the image signals S'1, S'2, S'n is negligible with respect to the degree of calibration precision, it being understood that a zero influence is quite obviously impossible to obtain in practice. Advantageously, the simultaneous injection of one and the same substantially identical calibration signal $S_E$ into several measurement pathways, or indeed into all the measurement pathways, makes it possible to test and to calibrate rapidly and simply the whole set of said measurement pathways, as well as, if appropriate, the measurement circuit 12A or indeed the control circuit 12B. More particularly, the calibration signal $S_E$ makes it possible to test the entire downstream portion of the measurement pathways V1, V2, Vn lying materially between the zone of injection of said calibration signal $S_E$ and the measurement circuit 12A. It will be possible in particular to thus test or identify, at a given instant, the operation and the characteristics, for example the gain and/or the filtering parameters, of said measurement circuit 12A. In this respect, the common calibration member 20 will preferably be disposed as far upstream as possible of the measurement pathways V1, V2, Vn, and in particular as close as possible to the sensors which gather the information useful to the positional servocontrol of the reflector member 2, and more particularly of the reflecting surface 3, doing so in order to be able to test the majority, if not the entirety of the measurement chain, from the first armature 15 up to the measurement and processing circuit 12A inclusive.

In this respect, it is noteworthy that the calibration member 20 may advantageously be integrated into the mirror 1, and more particularly be housed inside the casing 5, and preferably integrated into the reference support 14.

The calibration signal $S_E$ will preferably be substantially of the same physical nature, and more particularly of the same electrical nature, as the signals returned by the sensors C1, C2, Cn during the normal operation of the mirror 1. More particularly, the calibration signal $S_E$ will be able to consist of an electrical signal whose nature and amplitude are comparable to those of the measurement signals S1, S2, . . . , Sn and in particular of the same frequency, of the same voltage and/or of the same intensity as the characteristic values of said measurement signals S1, Sn, such as they are normally measured and utilized in the course of the positional servocontrol of the membrane 2, during the static or dynamic controlling of said membrane.

For this purpose, the calibration signal $S_E$ will advantageously be able to be delivered to the common calibration member 20 by a suitable generator 21. The generator 21 will advantageously be able to be configurable, so as to be able to generate any type of appropriate calibration signal $S_E$, and in particular make it possible to modify the shape (for example sinusoidal, square or triangular), the frequency, the amplitude in terms of voltage or current, of said signal. If appropriate, the generator 21 and the servocontrol circuit 12 will be able to cooperate to synchronize the calibration signal $S_E$ with the excitation signal $S_I$ which is applied between the armatures 15, 16 of the sensors to activate the latter and gather the corresponding measurement signal S1, Sn in response.

Moreover, the first and the second measurement pathways V1, V2, and preferably the majority if not the entirety of the measurement pathways V1, V2, Vn, will be able to be formed by conducting tracks 22, which will preferably all be of the same width and the same thickness. The common calibration member 20 will then preferably be formed by an electrode 23 which is common to said tracks 22. Preferably, the calibration member will thus be made in one piece, from one and the same sheet or one and the same block of passive electrically conducting material, on which the suitable shape and dimensions will be conferred.

In a particularly preferential manner, the common calibration member 20 will be separated from the measurement pathways, and in particular from the first and second measurement pathways V1, V2, by a dielectric layer 24 (electrically insulating) and will cooperate with said measurement pathways V1, V2, Vn by capacitive coupling.

Advantageously, a calibration member 20 which does not require a direct contact tap with the measurement pathways V1, V2 and does not disturb their operation outside of the calibration phases can be thus embodied in a particularly simple and compact manner. In this respect, the intersection zones 20A, at the level of which the calibration member 20 overlaps, and more particularly crosses (preferably in a substantially perpendicular manner), each of the measurement pathways V1, V2, Vn, will preferably be substantially identical to one another in their dimensions, their geometry, and their extent. Thus, said intersection zones 20A will preferably form capacitors of substantially identical capacitance, the coupling capacitance between the common calibration member 20 on the one hand and each of the measurement pathways V1, V2, Vn on the other hand being preferably substantially similar from one intersection 20A to the other.

Advantageously, the application of one and the same calibration signal $S_E$ to the calibration member 20 by the generator 21 will thus produce the appearance of an image signal S'1, S'2, S'n in theory substantially identical in each of said measurement pathways.

In a particularly preferential manner, such as is in particular represented in FIG. 7, the common calibration member 20 will preferably cross the measurement pathways V1, V2, Vn in a manner substantially perpendicular to their longitudinal direction. In this respect, the variant embodiment shown diagrammatically in FIG. 3 will in practice be able to exhibit tracks 22 which extend in a substantially radial manner with respect to the common calibration electrode 23, itself substantially circular. According to a variant embodiment corresponding in particular to that of FIG. 4, the common calibration member 20 can comprise a plurality of electrically inter-linked conducting spans 24 each disposed substantially plumb with the corresponding sensor C1, C2, Cn, advantageously on the opposite side of the reflector member 2 with respect to said sensor. Stated otherwise, the conducting spans 24 will advantageously each be able to be disposed opposite a sensor, under the first armature 15 of the latter, such as is illustrated in FIGS. 4 and 5. Preferably, the conducting spans 24 will each exhibit a surface area greater than or equal to that of the sensor armature 15, and preferably substantially entirely covering the latter.

The intersections 20A will then be able to correspond substantially to the overlay surface covered at one and the same time (on one side) by a conducting span 24 and (on the other side) by the armature 15 of the corresponding sensor.

By way of example, the network of the sensors C1, C2, Cn and the identical network of the conducting spans 24 will advantageously be able to be superimposed one on the other so as to coincide, while being shifted quincuncially by half a spacing with respect to the network of the actuators 6, such as is illustrated in FIG. 4.

Figure 3:
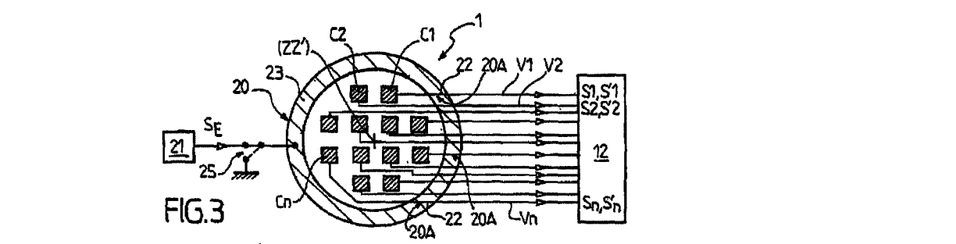
FIG. 3 illustrates, according to a schematic view from above, a variant arrangement of sensors and common calibration member within a mirror in accordance with the invention, such as that represented in FIG. 2.
Figure 4:
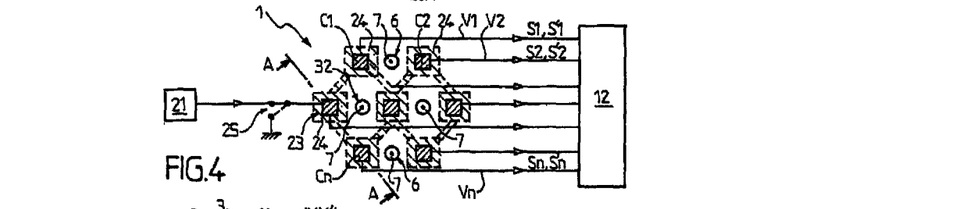
FIG. 4 illustrates, according to a schematic view from above, another variant arrangement of sensors and calibration member in accordance with the invention.

According to another variant embodiment corresponding in particular to FIGS. 1, 2, 3, 7 and 8, the calibration member 20 is disposed at the periphery of the mirror, and preferably formed by an electrode 23 which surrounds the whole of the network of the sensors C1, C2, Cn and, if appropriate, the whole of the network of the actuators 6. In this respect, the electrode 23 can in particular exhibit a contour, preferably closed, substantially conjugate to that of the mirror 1, and more particularly to the internal contour of the casing 5, and can in particular take the form of a substantially circular annulus, such as is illustrated in FIG. 3, or else of a substantially square (FIG. 7) or rectangular (FIG. 8) frame.

Preferably, the measurement pathways V1, V2, Vn are offset for their part from their respective sensor C1, C2, Cn toward the periphery of the mirror 1, and more particularly substantially from the interior, and in particular from the center of the space delimited by the electrode 23, toward the exterior, up to the edge of the casing 5 or indeed beyond, such as is illustrated in FIGS. 2, 3, 7 and 8. According to such a configuration, the measurement pathways V1, V2, Vn can thus advantageously cross, preferably in a substantially perpendicular manner, the electrode 23 whilst they leave the network, preferably dense, of the sensors to rejoin the periphery of the mirror and more particularly the measurement circuit 12A, optionally by way of a connection terminal strip to which said measurement circuit 12A is linked if the latter is outside the casing 5. Advantageously, such an arrangement makes it possible to house the calibration member 20 in an uncluttered zone of the mirror, and more particularly of the interior of the casing, which is situated away from the deformable portion of the reflector member 2, while making it possible to inject the calibration signal $S_E$ relatively upstream into the measurement pathways V1, V2, Vn.

Preferably, the calibration member 20 is common to the whole set of measurement pathways V1, V2, Vn, including, for example, if said mirror comprises a network of at least 10, 20, 50, or indeed 100 sensors, each recorded by a distinct measurement pathway. Indeed, the realization principle and the arrangement of the calibration member 20 in accordance with the invention can advantageously be extended and adapted whatever the number of sensors employed, the total surface area that they occupy, and the spatial density of their distribution.

Moreover, according to a characteristic which can constitute a fully-fledged invention, the common calibration member 20 can be associated with switching means 25, for example a mechanical, electromechanical or else electronic switch of the transistor kind, which make it possible to connect said calibration member 20 alternatively either to the calibration signal generator 21, or to ground. In a particularly advantageous manner, this makes it possible to prevent the common calibration member 20 from creating a coupling between the measurement pathways V1, V2, Vn and, better still, to use said calibration member, and more particularly the electrode 23, as an electromagnetic shielding screen protecting the sensors C1, C2, Cn and/or the measurement pathways associated therewith from electromagnetic disturbances, at least during periods during which the calibration member 20 is not invoked to inject the calibration signal $S_E$.

Moreover, the common calibration member 20 preferably occupies an invariant position with respect to the first and second measurement pathways, and preferably, more globally, with respect to the whole set of measurement pathways V1, V2, Vn. More particularly, the common calibration member 20 will advantageously be able to be distinct and detached from the membrane 2 and occupy a fixed position with respect to the casing, and in particular on the reference support 14 or inside the latter. Such an arrangement advantageously makes it possible to benefit from a simple, mechanically stable, robust mounting that is substantially invariant over the duration, making it possible to benefit between the calibration member 20 and each of the measurement pathways V1, V2, Vn from a substantially constant capacitance, little affected by the conditions of use of the mirror 1 and the changes arising in its environment.

Moreover, according to a preferential characteristic which can constitute an invention as such, the common calibration member 20 and the measurement pathways V1, V2, Vn belong to one and the same multilayer structure 30, such as is in particular illustrated in FIGS. 5 and 7, said multilayer structure 30 being able for example to be of the printed circuit board kind. Preferably, the multilayer structure 30 forms the reference support 14, preferably rigid, with respect to which the reflector member 2 moves when it deforms, reference support 14 which also preferably carries the sensors C1, C2, Cn, and more particularly the first armature 15 of each of them. Advantageously, it is thus possible to group together the calibration member 20, and more particularly the electrode 23, with at least some if not the entirety of the measurement pathways V1, V2, Vn, and more globally to integrate these elements within a multilayer structure which can advantageously coincide with the reference support 14, thereby making it possible to achieve a coherent multilayer subset, which may be distinct from the casing 5 and fitted separately inside the latter. Advantageously, such an arrangement makes it possible to simplify the fabrication of the mirror 1 and its assemblage on the basis of functional subsets, while allowing said mirror to gain in terms of compactness and robustness. Preferably, the multilayer structure 30 will comprise at least one conducting wiring layer 31 in which a plurality of tracks 22 are formed, advantageously separated and each connected to a sensor C1, C2, Cn. Preferably, the tracks 22 will be situated, here substantially horizontally, in a plane substantially normal on the one hand to the optical axis (ZZ') and on the other hand to the directions of deformation (XX'), thereby making it possible to gain in terms of compactness, to lower the cost of fabrication, and to avoid harmful couplings between pathways, avoiding creating mutual crossovers of the tracks 22, that is to say crossovers between the various measurement pathways V1, V2, Vn which thus preferably remain well separate from one another. Preferably, all the tracks will be situated in one and the same plane, within one and the same single layer. However, if the density of the sensors and of the tracks so demands, said tracks 22 will be able to be distributed in several layers forming superimposed strata, in several substantially parallel planes. If required, the tracks 22 will also be able to exhibit a sinuous trace, in one and the same horizontal plane, such as is represented in FIG. 7, and/or vertically between several distinct planes, so as to extend in a manner substantially parallel to one another in the direction of one and the same lateral edge of the mirror, while avoiding the obstacles formed by the actuators 6 or the other tracks 22.

Moreover, the multilayer structure 30 is preferably drilled with passages 32 which allow the actuators 6, and more particularly the mobile rigs 7, to pass through said multilayer structure 30. In a particularly advantageous manner, said multilayer structure 30 will thus be able to be disposed in the immediate vicinity of the membrane 2, and more particularly of the hidden face 4, in the interstitial space situated at the level of the upper portion of the actuator 6, and more particularly between the end of the mobile rigs linked to the membrane and the opposite end where the magnet 10 is situated. More globally, the intermediate reference support 14 will preferably be disposed between the reflector member 2 and the bottom of the casing 5A, and in a particularly preferential manner in the interstitial space lying between the hidden face 4 of the reflector member 2 and the widest portion of the actuators, and in particular of their mobile rigs 7, and/or, in a manner alternative to or cumulative with this disposition, in the interstitial space lying between the proximal end of the mobile rigs 7 (that is to say the upper end, which is closest to the reflector member 2) and their distal end (that is to say the lower end, which is furthest from the reflector member 2), and more particularly between the hidden face 4, some distance from the latter, and the upper portion of the permanent magnet 10. The passages 32 will then allow the rods 11 to pass through said reference support 14. Advantageously, such an arrangement makes it possible inter alia to dispose the sensors C1, C2, Cn, as well as their wiring, in an ordinarily unused interstitial space, and moreover to place them in a manner substantially overlapping with the actuators 6. A vertical tiering such as this therefore makes it possible to distribute on a lower tier the bulkiest parts of the actuators 6, in particular the coils 9, while the armatures 15 of the sensors are placed in an upper tier, directly opposite the membrane, while leaving a very slender separation distance, for example of the order of 100 μm, and preferably occupied only by air, remaining between the two armatures 15, 16 of each sensor. Of course, such a disposition makes it possible in particular to optimize and to maximize the useful surface area of the armatures 15, and thus the gain and the precision of the sensors, whose operation, and in particular capacitance, are not harmed by the presence of hefty bodies and in particular of portions of the actuators 6.

Moreover, the multilayer structure 30 preferably exhibits a first protection screen 33, in this instance oriented toward the membrane 2, and a second protection screen 34, remote from the first screen and oriented in the opposite direction, in this instance toward the bottom of the casing 5A, said protection screens 33, 34 being electrically conducting so as to form an electromagnetic shielding delimiting a tunnel 35 through which the measurement pathways V1, V2, Vn pass. Advantageously, by grounding the screens 33, 34, it is possible to insulate the tunnel 35 from electromagnetic disturbances and safeguard the measured signals S1, S2, Sn, S'1, S'2, S'n, even if the latter are very weak, thereby making it possible to obtain, by means of a particularly compact and trim structure, all things considered, an excellent signal-to-noise ratio which allows the measurement chain to gain in terms of precision. Such as is illustrated in FIG. 5, the first protection screen 33 can itself be covered, on the side situated toward the membrane 2, with an electrically insulating (dielectric) insulation layer 36, on the free surface of which are disposed the first armatures 15, which are preferably substantially plane. The tracks 22 will then be able to exit at the back of said armatures 15, so as to dive into the reference support 14, passing successively through the upper insulating layer 36 and then the first protection screen 33, through the metallized vertical wells, or "vias" 37, situated preferably plumb with the center of the armatures 15, so as to then run off transversely toward the periphery of the support 11, and more particularly of the lateral wall of the casing 5, situated substantially plumb with the peripheral outline of the membrane 2, from whence a connector allows the measurement circuit 12A to gather the signals S1, S2, Sn.

According to a variant embodiment illustrated in FIGS. 4 and 5, the electrode 23 of the calibration member 20 will advantageously be able to be interposed in the insulation layer 36, between the first armatures 15 of the sensors and the first protection screen 33, some distance from each of these two elements, so as to be able to inject the calibration signal $S_E$ directly at the level of the armatures 15, and more particularly at the back of the latter, and thus test the whole of the measurement chain.

Figure 8:
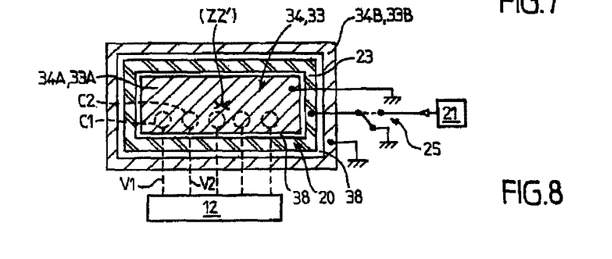
FIG. 8 illustrates, according to a schematic view from below, a variant arrangement of a deformable mirror that may be applied in particular to the variant embodiments represented in FIGS. 1, 2 and 7.

Moreover, according to another characteristic which may or may not be combined with the previous characteristics, and form if appropriate a fully-fledged invention, the electrode 23 of the calibration member 20 can advantageously be made in a conducting layer situated at the same level as the constituent conducting layer of one or the other of the screens 33, 34, and in particular of the second screen 34, such as is illustrated in FIG. 8.

In particular, the electrode 23 can take the form of a track, preferably closed on itself, which externally borders a first (radially) internal portion 33A, 34A of the screen 33, 34, internal portion that said electrode 23 surrounds preferably entirely, in the manner of a hoop.

Said electrode 23 can also be surrounded itself by a second external portion 33B, 34B of the same screen 33, 34, said electrode 23 thus lying (radially) between on the one hand said first internal portion 33A, 34A of the screen 33, 34, and on the other hand the second external portion 33B, 34B, said electrode 23 being, however, separated from each of these two internal and external portions by electrically insulating boundaries 38 which interrupt the conducting layer by delimiting the internal and external edges of said electrode.

Stated otherwise, the electrode 23 can advantageously be substantially (radially) sandwiched between two substantially concentric portions of the screen 34, in the same plane transverse to the axis (ZZ') of the mirror.

Thus, the calibration member 20 can be formed by an electrode 23 belonging to the same conducting layer as that of the first protection screen 33 or of the second protection screen 34, said electrode forming a peripheral span externally bordering the protection screen or forming an intermediate span substantially nested between two concentric portions 33A, 33B, 34A, 34B of said protection screen. In a particularly advantageous manner, such a disposition makes it possible to fabricate easily and at lesser cost, and in a very compact manner, an electrode 23 which can alternatively be used either as a calibration member portion 20 when it is connected, by the switching means 25, to the generator 21, or on the contrary as protection screen when it is connected to ground and thus substantially ensures the continuity of the screen 33, 34 which is coplanar with it.

It is thus possible to compound the advantages of the presence of a calibration member common to the various measurement pathways, with the compactness of the structure and the excellent protection of the signals measured outside of the calibration phases.

Of course, the reference support 14, and more particularly the multilayer structure 30, will be able to integrate certain electronic components, in particular passive components such as resistors or capacitors, belonging to the measurement circuit 12A and useful for the processing of the signals S1, S2, Sn arising from the sensors. In this respect, the multilayer structure 30 will advantageously be able to form, as one piece, a genuine embedded electronic card, of "multi chip module" (MCM) type, in which it will be possible to make certain components, in particular, passive components such as resistors or capacitors, through conducting or semi-conducting depositions on the lower or upper surface, or even in the deep layers, of said structure 30, thereby allowing the acquisition and the processing, at least partial, of the measurement signals representative of the shape of the reflector member 2.

If appropriate, the signals arising from the sensors will furthermore be able to be multiplexed, optionally by miniaturized electronics embedded in the casing 5 or indeed on the reference support 14, so as to reduce the complexity and the cost of the processing electronics belonging to the measurement circuit 12A.

Moreover, according to a preferential characteristic which can also constitute a fully-fledged invention, the reference support 14, and more particularly the multilayer structure 30, comprises, such as is illustrated in FIG. 7, an electrically conducting guard line 40, intended to be grounded and which forms a network of partitions separating the sensors C1, C2, Cn from the actuators 6, as well as the sensors C1, C2, Cn between them, so as to limit the phenomena of coupling or variation of capacitance that are liable to disturb the operation of said sensors. Said guard line 40 can advantageously take the form of a network of conducting bands snaking over the upper surface of the support 14, between the actuators 6, the passages 32, and the armatures 15, so as preferably to form pockets, in particular square or rhombic, around each of them.

Of course, the advantageous embodying of the multilayer structure 30, and more particularly of the reference support 14, in the form of a printed circuit board makes it possible in particular to embody, inter alia, the first armatures 15, by means of conducting pellets, the tracks 22 by means of copper bands, and the protection screens 33, 34, the guard line 40 or else the electrode 23 in the form of substantially continuous plane conducting bands or layers intimately integrated into the multilayer structure 30, doing so by inexpensive and well mastered methods such as photolithography and galvanic deposition.

Of course, the person skilled in the art will be able to adapt the invention by combining or isolating, freely, one or the other of the above-mentioned characteristics.

Of course, the invention also relates as such to any installation integrating one or more deformable mirrors 1 in accordance with the invention, and likewise any multilayer structure type subset 30 such as described above and forming a detached part comprising at least one first and one second measurement pathway V1, V2 as well as a common calibration member 20 of the electrode type 23 making it possible to inject, in particular by capacitive coupling, a calibration signal $S_E$ simultaneously into the first and the second measurement pathway.

Moreover, the invention relates of course to a method of calibrating a processing circuit 12 of a system 1 comprising a mobile and/or deformable surface 2, as well as at least one first and one second sensor C1, C2, Cn designed to provide respectively a first and a second measurement signal S1, S2, Sn relating to the shape and/or to the position of said mobile and/or deformable surface 2 and intended to be gathered, by means respectively of a first and of a second measurement pathway V1, V2, by said processing circuit 12, which is designed to determine the shape and/or the position of said mobile and/or deformable surface 2 on the basis of said measurement signals S1, S2. Said system 1 is preferably in accordance with the preceding description, and is advantageously formed by a deformable mirror, such as that described in detail hereinabove and to which, for the sake of simplicity and conciseness, exclusive reference will be made in what follows. In this case, said mobile and/or deformable surface 2 advantageously forms a reflector member, as has been set forth in detail hereinabove. As set forth previously, the processing circuit 12 is preferably a servocontrol circuit controlling the deformation and/or the displacement of said mobile and/or deformable surface 2.

Figure 6:
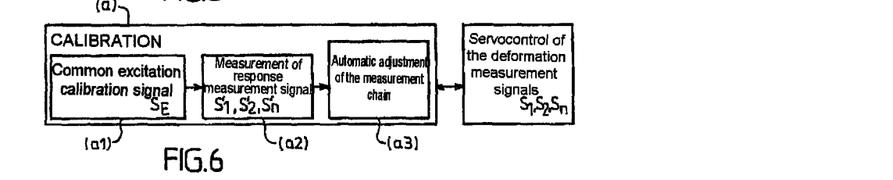
FIG. 6 illustrates, according to a summary block diagram, the manner of operation of a deformable mirror governed by a servocontrol system applying the calibration method in accordance with the invention.

Such a method will now be described with reference to the variant embodiments illustrated in the figures, and in particular with reference to the block diagram of FIG. 6.

According to the invention, said method comprises a step (a) of common calibration which comprises a sub-step (a1) of injection in the course of which a predefined calibration signal $S_E$ is injected simultaneously into each of the measurement pathways V1, V2, Vn, and then a sub-step (a2) of comparison, in the course of which the image signals S'1, S'2, S'n, retrieved by said measurement pathways V1, V2, Vn, are compared with the calibration signal $S_E$ which corresponds to them, the image signals S'1, S'2, S'n being substantially independent of the shape and of the position of said mobile surface 2 (as set forth previously), and then a sub-step (a3) of correction in the course of which one or more characteristics of the servocontrol circuit 12, such as the respective gain of each measurement pathway V1, V2, Vn, is or are modified so as to obtain at the level of each measurement pathway an image signal which is faithful to the calibration signal which is applied to it. More particularly, for this purpose it will be possible to toggle the switching means 25 so as to disconnect the electrode 23 from ground in order to link it to the generator 21, and then apply to said electrode 23, by virtue of said generator 21, a predefined calibration signal $S_E$, typically an alternating electrical signal, so as to be able to gather and measure the intensity of the current of the image signal S'1, S'2, S'n which flows in each measurement pathway on account of the capacitive coupling existing between said electrode 23, exciter, with the tracks 22. In a particularly preferential manner, substantially the same calibration signal is injected in the whole set of measurement pathways, so as to invoke each of said pathways in a substantially identical manner and thus gather in response an image signal S'1, S'2, S'n which is in principle substantially equal in each of said measurement pathways.

Preferably, so as to be able to test the measurement pathways under realistic conditions, and thus calibrate them as close as possible to their real operating conditions, the calibration signal $S_E$ consists of an electrical signal whose nature and amplitude are comparable to those of the measurement signals normally gathered within the framework of the operation of the mirror. In particular, the calibration signal $S_E$ may be substantially of the same frequency and the same voltage or the same intensity as the usual or envisageable values recorded in the measurement pathways when the sensors C1, C2, Cn are fed with a main excitation signal $S_I$ and when they advise as to the activity of the reflector member 2, and more particularly as to the nature and the variations of the profile of the deflection curve of the membrane 2.

Advantageously, by virtue of the calibration member 20 which injects a predetermined "realistic" calibration signal $S_E$, it is possible to reproduce in a direct manner, in the measurement pathways, and more globally in the servocontrol circuit 12, conditions which simulate a fictitious state of the mirror, freely chosen and mastered, to which there corresponds a known fictitious configuration of the sensors C1, C2, Cn, and consequently of the values of expected image signals S'1, S'2, S'n. Depending on the case, it will be possible to seek whether relative discrepancies are noted from one pathway to the other between the image signals S'1, S'2, S'n actually arising from the various measurement pathways, and/or whether absolute discrepancies are noted, in one or the other measurement pathway, between the image signal S'1, S'2, S'n actually gathered and the image signal which would theoretically be expected for the pathway considered (in regard to the calibration signal $S_E$ injected), if said measurement pathway were normally functional and appropriately calibrated. Consequently, it will be possible to detect a possible failure of one of the measurement pathways, or else to correct the characteristics of the measurement pathways V1, V2, Vn concerned in such a way as to obtain the expected absolute image signal in each of them and/or so as to harmonize in a relative manner, between the various pathways, their respective responses.

According to the disposition of the electrode 23 with respect to the measurement chain, the quantities characteristic of the calibration signal $S_E$ may in particular be similar to those of the excitation signal $S_I$ (for example if the coupling of said electrode takes place upstream, with the first armatures 15) and/or to those of the functional measurement signals S1, S2, Sn (for example if the coupling occurs downstream of the sensors and of their armatures 15, at the level of the tracks 22 themselves) which correspond to the response produced by the capacitive sensors when they are subjected to said excitation signal $S_I$ and when their capacitance varies, because their armatures 15, 16 approach one another or move apart, over a distance span (axial) corresponding substantially to the travel of the membrane 2 and of the mobile rig 7 associated therewith.

Preferably, the excitation signal $S_I$ will be created by applying an alternating voltage between on the one hand the membrane 2 and on the other hand the first armatures 15 of each sensor, and by preferably feeding said membrane 2 from the periphery of the latter. In this respect, it is noteworthy that, according to a characteristic which can constitute a fully-fledged invention, the measurement circuit 12A is preferably designed to be insensitive to the phase of the measurement signals S1, S2, Sn, or of the image signals S'1, S'2, S'n in such a way that the value of the measured signal will preferably be interpreted solely in regard to its amplitude. For this purpose, it will advantageously be possible to use a full-wave rectifier, or preferably two half-wave rectifiers whose signals will be superimposed, to gather and filter the alternating signal arising from each sensor C1, C2, Cn, and more particularly gathered by each measurement pathway, and observe the average intensity of the rectified signal, which depends solely on the peak intensity of said signal and not on the phase of said signal. Advantageously, such an arrangement makes it possible to circumvent measurement errors even though a phase shift is generally observed from the periphery toward the center of the membrane, when the radius of the membrane 2 is described in the direction of its center, because of the resistive losses (even tiny) of the conducting membrane and of the intermediate capacitive losses due to the various successively fed sensors.

Advantageously, the calibration method in accordance with the invention can be implemented within a more global method of servocontrol making it possible to steer, to monitor, to control, dynamically, the deformation of the reflector member 2 by means of a plurality of actuators 6 and of a plurality of sensors C1, C2, Cn which are independent.

According to an operating variant, the sensors being fed with a main excitation signal $S_I$ so as to be able to produce in response their measurement signal S1, S2, Sn according to the deformation profile of the membrane 2, the calibration signal $S_E$ is applied to the measurement pathways V1, V2, Vn so as to be superimposed on the functional measurement signals S1, S2, Sn.

In a particularly preferential manner, the calibration signal $S_E$ can then be applied to the measurement pathways in phase shift, and more particularly in phase opposition with the main measurement signal S1, S2, Sn and/or, in phase shift or phase opposition with the excitation signal $S_I$.

Advantageously, this makes it possible to apply in a simultaneous manner, and optionally in a permanent manner, at one and the same time a functional excitation of the sensors, by applying the excitation signal $S_I$ between on the one hand the common mobile armature 16 formed by the membrane 2 and on the other hand the individual fixed armature 15 specific to each sensor, and, simultaneously, a calibration signal $S_E$, applied between on the one hand the electrode 23, distinct from and independent of the membrane 2, and on the other hand said fixed armature 15 or the track 22 corresponding to the measurement pathway V1, Vn associated therewith.

It is thus possible on the one hand to measure the deflection curve of the membrane 2 by gathering, by rectification or matched filtering, the measurement signals S1, S2, Sn corresponding to the response to the excitation signal $S_I$ emitted according to the first phase, and on the other hand, substantially at the same time, in the course of one and the same cycle, to monitor the state of the measurement pathways, by gathering, by rectification or filtering distinct from the previous, the image signals S'1, S'2, S'n corresponding to the response to the calibration signal $S_E$ emitted according to the second phase. The invention thus makes it possible to detect substantially in real time the operating anomalies and/or the drifts, for example thermal or electronic, of the various measurement pathways, and/or furthermore to normalize the measurement signals S1, S2, Sn by referring them to the image signal S'1, S'2, S'n of the calibration signal $S_E$ that follows the same channel (the same measurement pathway V1, V2, Vn). Advantageously, it is consequently possible for possible defects or drifts of the measurement chain to be corrected immediately and almost in real time.

According to another operating variant, the method can make it possible to alternate, in an exclusive manner, either normal operating phases, in which (only) the main excitation signal $S_I$ is applied to the sensor so as to measure the deformation of the membrane 2, or calibration phases, during which (only) the calibration signal $S_E$ is applied. More particularly, the excitation signal $S_I$ can then be interrupted during the application of the calibration signal $S_E$ to the measurement pathways.

Such a system exhibits the advantage of not creating interference between the calibration signal $S_E$ and the main signals S1, S2, Sn which convey the position and/or the local displacements of the membrane 2 in line with each actuator 6.

In this respect, it is in particular conceivable to periodically calibrate the mirror 1, and more particularly the measurement circuit 12A of the servocontrol circuit 12, by occasionally interrupting the measurement of the real deformation, but without however interrupting the positional holding of the mirror, that is to say the excitation of the actuators 6 themselves, and then by carrying out a calibration, and thereafter by resuming the monitoring of the deformation by the measurement circuit.

Of course, when the calibration phase ceases, the electrode 23 can advantageously be disconnected from the generator 21 and be reconnected to ground so as to contribute to the electromagnetic protection of the tracks 22.

Advantageously, it is noteworthy that the calibration method and the mirror 1 in accordance with the invention do not make it necessary to dismantle the mirror 1, nor even to actually interrupt its service, in order to undertake the calibration, in particular when said calibration is effected in a manner superimposed and simultaneously with the normal measurement of the real position of the reflector member 2. If appropriate, even assuming that the calibration and the monitoring of the deformation are alternated, the servocontrol circuit 12 can continue to control the position and/or the displacement of the actuators 6 permanently. In this respect, the configuration of the reflector member 2 can advantageously be "frozen" in the last configuration which immediately precedes the calibration phase, while the monitoring is suspended, the setpoints applied to the actuators 6 being able for this purpose to be stored in a buffer memory and held at their last known value for the duration necessary for the calibration. The configuration of the reflector member 2, and more particularly said setpoints, will thereafter be able to be refreshed again as soon as the calibration phase has terminated and the active monitoring phase has resumed.

Advantageously, the mirror 1 in accordance with the invention will be able to constitute a micro-mirror whose actuator or actuators 6 possess a useful travel of substantially between 1 µm and 20 µm or indeed 40 µm, whose precision of positioning and of servocontrol with respect to a given setpoint is substantially between 1 nm and 10 nm, and whose setpoint can be modified according to a refresh frequency which is substantially between 10 Hz and 10 kHz.

In particular, the membrane 2 will be able to exhibit a transverse dimension, and in particular a diameter, of substantially between 5 mm and 30 mm, a thickness of substantially between 5 µm and 50 µm, the overall height of the casing being substantially between 10 mm and 100 mm, the linear spacing gap between two actuators 6 between 1 mm to 3 mm, the rod 11 width between 50 µm and 300 µm, the magnet 10 diameter between 500 µm and 1000 µm, and the coil 9 diameter between 1000 µm and 1700 µm. The capacitance of the capacitive sensors C1, C2, Cn will be able to be substantially less than 1 pf, or indeed than 0.1 pf, and in particular substantially between 0.04 pf or 0.05 pf and 0.5 pf.

The excitation signal $S_I$, as well as the calibration signal $S_E$, will be able in particular both to be formed by periodic signals, for example sinusoidal, square, or triangular, of amplitude substantially between 10 V and 400 V, and for example equal to 100 V and of frequency substantially between 10 Hz and 500 kHz, and for example equal to 100 kHz.

Advantageously, the mirror 1 in accordance with the invention and the corresponding method confer excellent reliability on said mirror over the duration, high robustness in relation to drifts, and a capacity to self-correct automatically as a function of alterations in its operating conditions, in particular thermal, electronic or electromagnetic, and to do so completely transparently to the user. By ensuring regular control and calibration of the mirror, the method improves the performance of the mirror at one and the same time in terms of precision, speed, and stability, including during fast alternating deformations or ones of large amplitude. Furthermore, it can advantageously be implemented by means of a particularly simple, compact, lightweight, and preferably modular structure that is relatively easy and inexpensive to fabricate and to assemble, and which allows the mirror to carry embedded within it, without extra bulk, a common calibration member fully contained in its casing. Furthermore, it makes it possible to circumvent the use of expensive external mechanical jigs or calibration devices that are themselves potentially sources of calibration errors and therefore of measurement errors.

POSSIBILITY OF INDUSTRIAL APPLICATION

The invention finds its industrial application in the design, fabrication and use of systems with mobile and/or deformable surface.

The invention claimed is:

1. A system comprising a mobile and/or deformable surface (2) as well as at least one first and one second sensor (C1, C2) designed to provide respectively a first and a second measurement signal (S1, S2) relating to the shape and/or to the position of said mobile and/or deformable surface (2) and intended to be gathered by a processing circuit (12) designed to determine the shape and/or the position of said mobile and/or deformable surface (2) on the basis of said measurement signals (S1, S2), said system (1) comprising for this purpose at least one first measurement pathway (V1) for gathering the first measurement signal (S1) and at least one second measurement pathway (V2) for gathering the second measurement signal (S2), said system (1) being characterized in that it comprises a common calibration member (20) for injecting a known calibration signal ($S_E$) simultaneously into at least the first measurement pathway (V1) and the second measurement pathway (V2) so as to allow the calibration of all or part of the processing circuit (12), said common calibration member (20) being designed such that image signals (S'1, S'2) retrieved by said measurement pathways (V1, V2) in response to injection of said calibration signal ($S_E$) are substantially independent of the shape and of the position of said mobile and/or deformable surface (2).

2. The system of claim 1, characterized in that said processing circuit (12) is a servocontrol circuit controlling the deformation and/or the displacement of said mobile and/or deformable surface (2).

3. The system of claim 1, characterized in that, the first and the second measurement pathways (V1, V2) are formed by conducting tracks (22), and the common calibration member (20) is formed by an electrode (23) common to said tracks (22).

4. The system of claim 3, characterized in that the common calibration member (20) comprises a plurality of conducting spans (24) electrically linked together and each disposed substantially plumb with the corresponding sensor (C1, C2), on the opposite side of the mobile and/or deformable surface (2) with respect to said sensor.

5. The system claim 1, characterized in that the common calibration member (20) is separated from the first and second measurement pathways (V1, V2) by a dielectric layer (24) and cooperates with said measurement pathways by capacitive coupling.

6. The system of claim 1, characterized in that the common calibration member (20) and the measurement pathways (V1, V2) belong to one and the same multilayer structure (30), of the printed circuit board kind.

7. The system of claim 6, characterized in that the multilayer structure (30) forms a rigid reference support (14), with respect to which the mobile and/or deformable surface (2) moves when it deforms, and which carries the sensors (C1, C2).

8. The system of claim 6, characterized in that it comprises a plurality of actuators (6) each possessing a mobile rig (7) fixed to the mobile and/or deformable surface (2) so as to be able to locally drive the mobile and/or deformable surface (2) in displacement, and in that the multilayer structure (30) is drilled with passages (32) allowing said mobile rigs (7) to pass through it.

9. The system of claim 6, characterized in that the multilayer structure (30) exhibits a first protection screen (33) and a second protection screen (34) remote from the first protection screen (33), said screens (33, 34) being electrically conducting so as to form an electromagnetic shielding delimiting a tunnel (35) through which the measurement pathways (V1, V2) pass.

10. The system of claim 9, characterized in that the calibration member (20) is formed by an electrode (23) belonging to the same conducting layer as that of the first protection screen (33) or of the second protection screen (34), said electrode forming a peripheral span externally bordering the protection screen or an intermediate span substantially nested between two concentric portions (33A, 33B, 34A, 34B) of said screen.

11. The system claim 1, characterized in that it comprises a network of sensors (C1, C2) disposed substantially plumb with the mobile and/or deformable surface (2), in that the measurement pathways (V1, V2) are offset from their respective sensor toward the periphery of the system 1, and in that the calibration member (20) is disposed at the periphery of said system (1), and preferably formed by an electrode (23) which surrounds the whole of the array of sensors (C1, C2).

12. The system of claim 1, characterized in that it comprises a network of at least 10, 20, 50 or 100 sensors (C1, C2), each recorded by a distinct measurement pathway (V1, V2), and in that the calibration member (20) is common to the whole set of said measurement pathways (V1, V2).

13. The system claim 1, characterized in that the sensors (C1, C2) constitute position sensors for locally recording the variable position of the mobile and/or deformable surface (2) with respect to a reference support (14) integrated into the system.

14. The system claim 1, characterized in that the common calibration member (20) is associated with switching means (25) for connecting it up either to a calibration signal generator (21), or to ground.

15. The system claim 1, characterized in that the common calibration member (20) occupies an invariant position with respect to the first and second measurement pathways (V1, V2).

16. The system of claim 1, characterized in that said mobile and/or deformable surface (2) is formed by an electrically conducting membrane.

17. The system of claim 1, characterized in that it constitutes a deformable mirror, said mobile and/or deformable surface (2) forming a reflector member.

18. A method of calibrating a processing circuit (12) of a system (1) comprising a mobile and/or deformable surface (2) as well as at least one first and one second sensor (C1, C2) designed to provide respectively a first and a second measurement signal (S1, S2) relating to the shape and/or to the position of said mobile and/or deformable surface (2) and intended to be gathered, by means respectively of a first and of a second measurement pathway (V1, V2), by said processing circuit (12), which is designed to determine the shape and/or the position of said mobile and/or deformable surface (2) on the basis of said measurement signals (S1, S2), said method being characterized in that it comprises a step (a) of common calibration which comprises a sub-step (a1) of injection in the course of which a predefined calibration signal ($S_E$) is injected simultaneously into each of the measurement pathways (V1, V2), and then a sub-step (a2) of comparison, in the course of which image signals (S'1, S'2) retrieved by said measurement pathways (V1, V2) are compared with the calibration signal ($S_E$) which corresponds to them, the image signals (S'1, S'2) being substantially independent of the shape and of the position of said mobile surface (2), and then a sub-step (a3) of correction in the course of which one or more characteristics of the processing circuit (12), such as the respective gain of each measurement pathway (V1, V2), is or are modified so as to obtain at the level of each pathway an image signal which corresponds to the calibration signal ($S_E$) which is applied to it.

19. The calibration method of claim 18, characterized in that said processing circuit (12) is a servocontrol circuit controlling the deformation and/or the displacement of said mobile and/or deformable surface (2).

\* \* \* \* \*